Patented Oct. 7, 1941

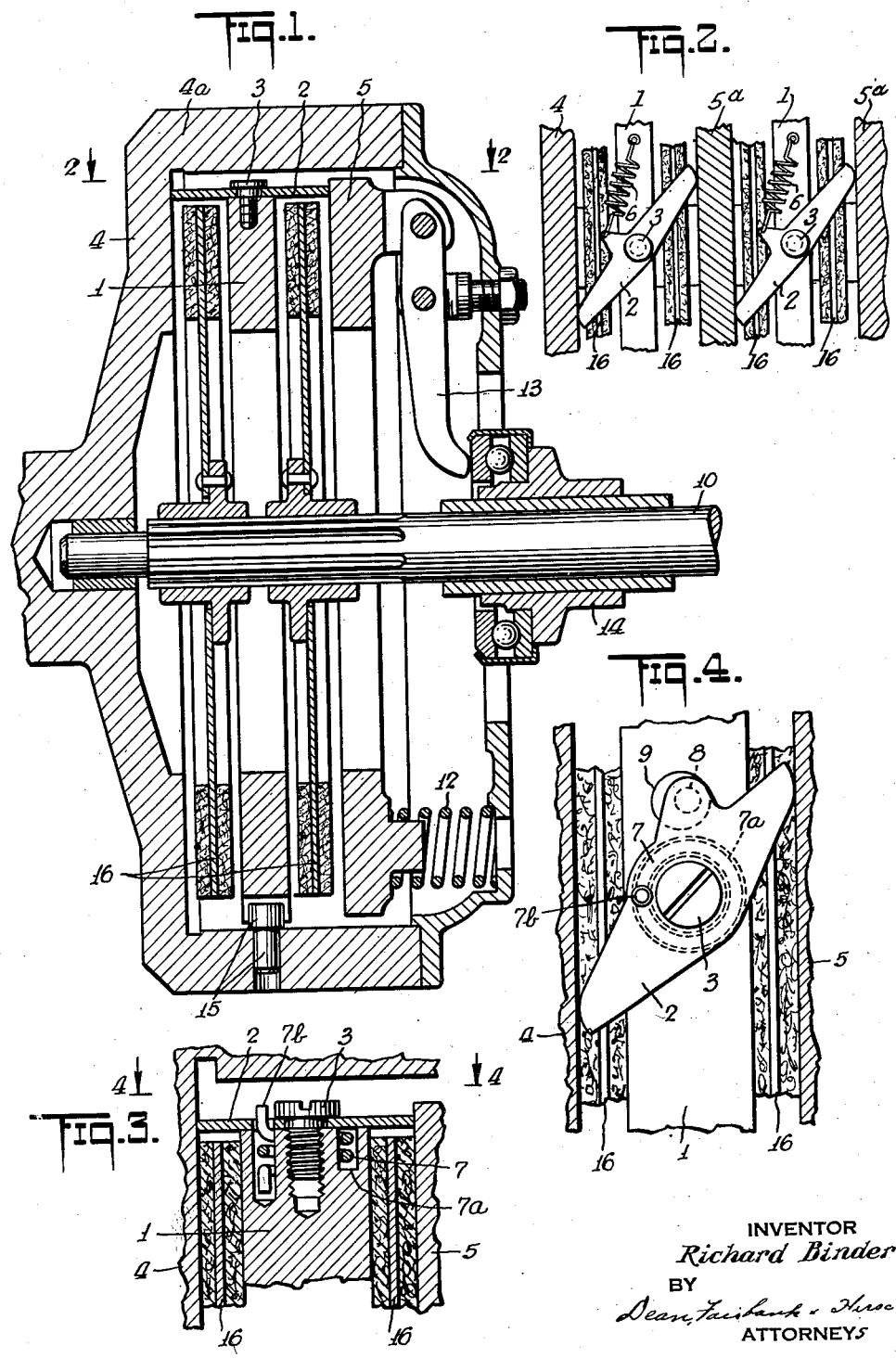

2,257,877

UNITED STATES PATENT OFFICE 2,257,877

DISK CLUTCH

Richard Binder, Schweinfurt, Germany

Application June 12, 1940, Serial No. 340,099
In Germany June 24, 1939

5 Claims. (Cl. 192—69)

The invention relates to disk clutches comprising friction disks alternately disposed and interconnected to relatively rotating parts of power transmitting driving and driven parts of the clutch. This invention is particularly applicable on spring engaged multiple disk clutches for vehicles in which the disengagement of clutches is effected by axially shifting friction disks out of contact with counter-disks.

The object of the invention is to obviate undue friction of the relatively rotating disks when disconnected so that the driven elements are held at a distance from the driving parts.

This object is attained by the provision of separating means which on release of the clutch secure the disks rotating in unison away from each other thus permitting an intermediate disk to remain clear of the friction faces of inactive clutch disks on opposite sides thereof. These means are preferably spring-actuated with the result that owing to their automatic operation, special adjusting devices controlled by the driver may be dispensed with.

These means allow an exact adjustment of the intermediate disk in the middle position excluding at the same time the disadvantageous influences hitherto always occurring in the inclined position of the clutch. Moreover, in contradistinction to known devices the adjustment so effected is absolutely independent of the wear of the clutch linings.

An embodiment of the invention is obtained by the provision at the circumference of the intermediate disk at least in two points of two-armed levers which, under the action of springs, are swingably arranged about pivots while the ends of the arms bear against the oppositely situated friction surfaces of outer disks under the action of their springs. In comparison with springs or stops hitherto arranged at the side of the intermediate disk, the pivoted separating levers provide the advantage that the outer disks are equally distanced from the intermediate disk and the latter disk is always positively adjusted into the exact middle position even on sloping ways.

In the accompanying drawing which forms a part of this specification various constructional embodiments of the invention are shown by way of example.

In this drawing:

Fig. 1 is a section through the axis of a clutch provided with the disk separating means, and shown of the type in which a single intermediate clutch disk is provided.

Fig. 2 shows a plan view partially in section of the circumference of the intermediate disk, taken somewhat along the line 2—2 of Fig. 1, but showing a clutch of the multiple intermediate disk type.

Fig. 3 shows a section of a modified detail of the separating device, and

Fig. 4 is a plan view of the device shown in Fig. 3 taken along the line 4—4 of Fig. 3, and illustrating a device limiting the amplitude of the separating device.

Like numerals designate like parts throughout all figures of the drawing.

Referring to Fig. 1 the multiple disk clutch is composed of a casing 4a fixed for example on a driving shaft (not shown), and provided with a disk-body 4 constituting the stationary friction disk, an axially movable friction disk 5 placed in the casing opposite to said disk body, an intermediate friction disk 1, and driven disks 16, 16 shiftably but non-rotatably mounted for example on the driven shaft 19. When operating, all the clutch disks are pressed against each other by springs 12, while levers 13 can be operated by means of a shiftable clutch collar 14 when the clutch is to be disconnected. The friction disks 1 and 5 are positively connected to the casing 4a respectively through a lug 15 and the disengaging levers 13 so that the said parts rotate in unison. The lined coupling disks 16 and 16 rotate with the shaft 10.

Two or more two-armed levers 2 are pivotally mounted upon pins 3 provided at the circumference of the intermediate clutch disk 1. The two-armed levers with their one arm bear against the friction surface of the disk body 4 and with their other arm against the friction surface of the pressure and friction disk 5 of the clutch. The two arms of the lever 2 preferably are of equal length. By providing sufficiently strong springs 6 (Fig. 2) rotation of these levers 2 about the pivot 3 is effected to effect equal separation of the disks whenever the clutch is disengaged, so that the positioning of the intermediate disk 1 in the middle with respect to the opposite disks 4 and 5 is assured.

Fig. 2 shows the separating device of the present invention applied to a clutch having a plurality of intermediate disks 1, each carrying its own set of spring-pressed separating levers 2, these intermediate disks being separated by axially movable friction disks 5a.

Figs. 3 and 4 show a modified construction, particularly a modified arrangement of the spring. In this case a torsion spring 7 is inserted in the intermediate disk 1. One end of this torsion spring 7 engages in a corresponding bore 7a of the intermediate disk and the other end 7b of said spring engages a hole provided in the two-armed lever 2.

To ensure an easy assembling of the clutch the amplitude of the lever 2 preferably is limited. Fig. 4 shows such a limiting device comprising a pin 8 fixed to each lever 2 and extending into a respective bore 9 of the intermediate disk 1.

By means of the spring-pressed separating levers of the present invention an additional advantage is obtained. In clutches provided with two disks, rattling noises often occur during disengagement of the clutch, due to the play of the intermediate disk in its guides. By the use of sufficiently strong springs 6, 7, it is easily possible to render the bearing pressure between the double-armed lever 2 and the friction surfaces 4, 5 and 5a so large that the friction prevents vibration of the intermediate disk or disks within the guide due to the irregular running of the motor, whereby these rattling noises are excluded.

I claim:

1. In a multiple disk clutch of the type comprising a pair of outer friction disks and an intermediate disk connected for rotation with one element of the clutch, and other disks alternately arranged with respect to said outer and intermediate disks and connected to the other element of said clutch, means for positively spreading said outer disks apart with respect to the intermediate disk when said elements are disengaged, including a two-armed lever pivotally supported intermediate its ends to said intermediate disk and having its two arms slidably engaging said outer disks respectively to move said outer disks away from said intermediate disk upon rotation of said lever about its pivotal support, and spring means normally tending to rotate said lever about its pivotal support for disk spreading action.

2. In a multiple disk clutch of the type comprising a pair of outer friction disks and an intermediate disk connected for rotation with one element of the clutch, and other disks alternately arranged with respect to said outer and intermediate disks and connected to the other element of said clutch, means for positively spreading said outer disks apart with respect to the intermediate disk when said elements are disengaged, including a lever pivotally supported intermediate its ends to said intermediate disk, and extending obliquely between said outer disks in disengaged position of said clutch with its outer ends slidably engaging said outer disks respectively, whereby upon rotation of said lever about its pivotal support said outer disks will be moved away from said intermediate disk, and spring means normally tending to rotate said lever about its pivotal support for disk spreading action.

3. In a multiple disk clutch of the type comprising a pair of outer friction disks and an intermediate disk connected for rotation with one element of the clutch, and other disks alternately arranged with respect to said outer and intermediate disks and connected to the other element of said clutch, means for positively spreading said outer disks apart with respect to the intermediate disk when said elements are disengaged, including a two-armed lever pivotally supported intermediate its ends to said intermediate disk and having its two arms slidably engaging said outer disks respectively to move said outer disks away from said intermediate disk upon rotation of said lever about its pivotal support, spring means normally tending to rotate said lever about its pivotal support for disk spreading action, and stop means for limiting disk spreading rotation of said lever.

4. In a multiple disk clutch of the type comprising a pair of outer friction disks and an intermediate disk connected for rotation with one element of the clutch, and other disks alternately arranged with respect to said outer and intermediate disks and connected to the other element of said clutch, means for positively spreading said outer disks apart with respect to the intermediate disk when said elements are disengaged, including a two-armed lever pivotally supported intermediate its ends to said intermediate disk and having its two arms slidably engaging said outer disks respectively to move said outer disks away from said intermediate disk upon rotation of said lever about its pivotal support, spring means normally tending to rotate said lever about its pivotal support for disk spreading action, said intermediate disk having a recess, and a pin secured to said lever at a section thereof spaced from its pivotal support and extending with substantial play in said recess for limiting disk spreading rotation of said lever.

5. In a multiple disk clutch of the type comprising a group of disks connected for rotation with one element of the clutch, and other disks alternately arranged with respect to said group of disks and connected to the other element of said clutch, means for positively spreading the disks of said group apart when said elements are disengaged, including a plurality of independent levers pivotally supported intermediate their ends to alternate disks respectively of said group with the outer ends of each lever slidably engaging respective adjoining disks of said group on opposite sides of said lever, and spring means normally tending to rotate said levers independently about their pivotal supports for disk spreading action.

RICHARD BINDER.